United States Patent
Tulloch

(12) 
(10) Patent No.: US 8,126,505 B2
(45) Date of Patent: Feb. 28, 2012

(54) DATA VERIFICATION SYSTEM FOR A NEAR FIELD COMMUNICATIONS ENABLED DISPLAY

(75) Inventor: Gill Tulloch, Dundee (GB)

(73) Assignee: NCR Corporation, Duluth, GA (US)

( * ) Notice: Subject to any disclaimer, the term of this patent is extended or adjusted under 35 U.S.C. 154(b) by 460 days.

(21) Appl. No.: 12/339,698

(22) Filed: Dec. 19, 2008

(65) Prior Publication Data

US 2010/0161410 A1    Jun. 24, 2010

(51) Int. Cl.
*H04M 1/24* (2006.01)
*H04W 4/00* (2009.01)
*G06F 15/173* (2006.01)

(52) U.S. Cl. .............. 455/557; 455/41.1; 455/414.1; 709/224

(58) Field of Classification Search .......... 455/41.1, 455/41.2, 41.3, 414.1, 556.1, 557, 418, 419, 455/420; 709/203, 219, 224
See application file for complete search history.

(56) References Cited

U.S. PATENT DOCUMENTS

| | | | | |
|---|---|---|---|---|
| 5,966,696 A | * | 10/1999 | Giraud | 705/14.41 |
| 7,886,975 B2 | * | 2/2011 | Matsuo et al. | 235/439 |
| 2006/0094405 A1 | * | 5/2006 | Dupont | 455/414.1 |
| 2007/0184815 A1 | * | 8/2007 | Aebi | 455/406 |
| 2008/0254744 A1 | * | 10/2008 | Tricker | 455/41.2 |
| 2009/0156190 A1 | * | 6/2009 | Fisher | 455/418 |
| 2009/0270045 A1 | * | 10/2009 | Flaherty | 455/73 |
| 2010/0075666 A1 | * | 3/2010 | Garner | 455/426.1 |
| 2010/0091988 A1 | * | 4/2010 | Srinivasan et al. | 380/46 |

* cited by examiner

*Primary Examiner* — Blane J Jackson

(74) *Attorney, Agent, or Firm* — Michael Chan; Paul W. Martin; Dana T. Hustins

(57) ABSTRACT

An NFC enabled telecommunications communication device is mounted behind the touch point of a smart poster. The content data downloadable from the smart poster is managed remotely, monitored and usage data of the smart poster analyzed at a server via the telecommunications device.

14 Claims, 2 Drawing Sheets

Step 300 — Downloading usage data from a smart poster

Step 302 — Analyse the usage data to determine at least one characteristic of a usage profile

DATA VERIFICATION SYSTEM FOR A NEAR FIELD COMMUNICATIONS ENABLED DISPLAY

FIELD OF THE INVENTION

This invention relates to a smart poster. More particularly, but not exclusively, it relates to a networked smart poster.

BACKGROUND TO THE INVENTION

Smart posters are billboards or posters displayed in a public area equipped with a unique contactless near field communications (NFC) tag, typically a radio frequency identification (RFID) tag, embedded in them. The NFC tag allows a customer to place a mobile device, for example a mobile telephone, adjacent to a touchpoint within the poster that is associated with the tag in order to engage with the advertised product. Typical methods of engagement with the advertised products include connecting to a website associated with the product where the customer can purchase the advertised product, gain extra information about the product. Engaging with the NFC tag may also register the customer's mobile device for reception of short message service (SMS) text message alerts associated with the product. Smart posters simplify customer interaction with the advertised product by removing the need for the customer to manually record or enter a promotional code into their mobile device. Smart posters also increase the potential for viral marketing as information downloaded from a smart poster can be easily transferred between mobile devices.

Tampering with smart posters, for example the replacement of the legitimate NFC tag with a spurious NFC tag, raises a number of security issues. For example, a user could be directed to a site where malicious code is downloaded on to the user's mobile device. Physical damage, for example vandalism, to the poster can lead to the NFC tag being damaged with the consequence that customers cannot obtain the information stored on the NFC tag. Currently, the status of NFC tags can be monitored only by the manual inspection of each poster.

Errors in the data loaded onto NFC tags can lead to customers being unable to obtain the information about the advertised products, or to customers being directed to incorrect websites. Currently, the correction of such errors in NFC tag programming requires the physical replacement of all NFC tags that are incorrectly programmed.

Usage data detailing the number of times that the data stored on the NFC tag is downloaded would be of use in analyzing the effectiveness of an advertising campaign, for example to establish the most effective geographical location for a given campaign, or over a series of campaigns. Currently, there is no system whereby this information can be obtained.

SUMMARY OF THE INVENTION

According to a first aspect of the present invention there is provided a smart poster comprising:
a near field communications (NFC) device; and
a transceiver unit;
the NFC device being arranged to transmit data to a mobile device upon the mobile device coming into the transmission range of the NFC device;
the transceiver unit comprising a network connection device and a processor the processor being operably connected to the NFC device and arranged to monitor the transmission of data by the NFC device, wherein the processor is arranged to communicate details of a transaction between the NFC device and the mobile device to a remote server over a network, via the network connection device.

The logging of transactions between the smart poster and mobile device allows the usage and status of the smart poster to be monitored.

The NFC device may be arranged to interrogate the mobile device during connection therewith. The processor may be arranged to communicate data received at the NFC device during interrogation of the mobile device to the remote server. The NFC device may be arranged to interrogate the mobile device for data relating to any of the following: telephone number, user identity, telecommunications service provider. The processor may be arranged to collect usage data indicative of the number of times that the NFC device has been accessed.

The processor of the transceiver unit may be arranged to be interrogated by the remote server. The processor of the transceiver unit may be arranged to be interrogated by the remote server in order to verify that the data stored upon the NFC device is valid, for example by verifying that the latest version of software is installed and/or that a checksum value is correct. The processor of the transceiver unit may be arranged to compare verification data received from the remote server to data stored upon the NFC device in order to verify that the data stored upon the NFC device is valid. The processor may be arranged to receive corrected or updated data from the remote server and may further be arranged to upload the data to the NFC device.

The remote control, correction and updating of data stored on the NFC device allows the content of the smart poster to correspond to the particular promotional campaign of current interest without the need for manual intervention.

A smart poster that has been tampered with, but the NFC device not removed, can possibly be reintroduced into use by updating them, thereby maximizing the number of possible interaction points for a consumer.

The transceiver unit may comprise at least one of the following: a cellular transceiver, a dial-up modem, a broadband modem.

The NFC device may comprise a RFID tag.

According to a second aspect of the present invention there is provided a smart poster monitoring system comprising:
at least one smart poster according to the first aspect of the present invention;
a network; and
a server arranged to communicate with the network connection device of the smart poster over the network.

The server may be arranged to attempt to interrogate the processor of the smart poster and to generate an alarm signal if a response other than that expected is received. The server may be arranged to generate an alarm signal if no response is received from the processor. The server may be arranged to generate an alarm signal if a response indicative that the NFC device has been replaced with an unauthorized NFC device is received from the processor.

Such a system allows the operational status of the smart poster to be monitored. This allows the detection of a damaged or faulty NFC device in the smart poster to be detected. Tampering with the NFC device and the replacement of the authorized NFC device with an unauthorized one can also be detected.

The server may be arranged to interrogate the smart poster to verify the data stored upon the NFC device is valid. The server may be arranged to upload correct data to the NFC device should the data stored upon the NFC device fail verification. The server may be arranged to upload update data to the smart poster to be stored on the NFC device.

The remote control, correction and updating of data stored on the NFC device allows the content of the smart poster to correspond to the particular promotional campaign of current interest without the need for manual intervention. Furthermore, smart posters that have been tampered with, but the NFC device not removed, can possibly be reintroduced into use by updating them, thereby maximizing the number of possible interaction points for a consumer.

The system may comprise a plurality of smart posters according to the first aspect of the present invention.

According to a third aspect of the present invention there is provided a method of improving the targeting of an advertising campaign comprising the steps of:
  i) downloading usage data from a smart poster according to the first aspect of the present invention;
  ii) analyzing the usage data to determine at least one characteristic of a usage profile.

The method may comprise combining the analyses of steps (i) and (ii) from a plurality of smart posters. The method may comprise analyzing the combined usage data to determine at least one characteristic of the usage profile.

The method may comprise cross-correlating usage data with a database storing user information, using a mobile device identifier.

The characteristic of the usage profile may comprise a demographic breakdown of users based upon of the following: age, geographical location, mobile telephony service provider, income of user, educational level.

Such analysis of user interactions with the smart poster, or a number of smart posters, allows targeting of advertising campaigns in geographical areas and/or at target market demographics thereby improving the efficacy of the advertising campaign.

The method may comprise updating content of the NFC device any one of the following: deleting previous content, amending previous content, storing the uploaded content in parallel to the previous content. This allows switchover of content at a convenient time and also allows previously loaded content to be replayed if new content is found to be faulty.

According to fourth aspect of the present invention there is provided a method of varying content downloadable from a smart poster comprising uploading content to an NFC tag of the smart poster via a network connection device of the smart poster.

The network connection device may comprise a wireless modem, or a broadband connection. The network connection device may comprise a cellular telecommunications device.

According to a fifth aspect of the present invention there is provided a method to remotely synchronize visual images displayed on a display of smart poster with the content output from an NFC device of the smart poster, under control of a remote server comprising:
updating data to be output from the NFC device and issuing control data controlling the display of visual media, synchronously from the remote server.

This would apply to smart poster with dynamic visual content through mechanical or electronic means, for example scrolling. Such a facility allows smart poster technology to be used in locations where advertisers wish to maximize return from the physical space available by scrolling round advertisements, or by displaying advertisements targeted at the type of consumers present at a particular time of day.

The control data may comprise image data. The control data may comprise command data arranged to instruct the driving of a motor.

This method may comprise of synchronizing the sending of instructions to update content of the NFC device and to update the visual content of the smart poster controller.

BRIEF DESCRIPTION OF THE DRAWINGS

Embodiments of the various aspects of the present invention will now be described, by way of example only, with reference to the accompanying drawings, in which.

DETAILED DESCRIPTION OF PREFERRED EMBODIMENTS

It will be appreciated that the following description is of preferred embodiments of the present invention and the best mode of putting the present invention into effect that is known to the applicant. The description is exemplary only in respect of these preferred embodiments and is not to be construed as limiting or restricting the scope of protection defined in the claims appended hereto.

Figure 1:
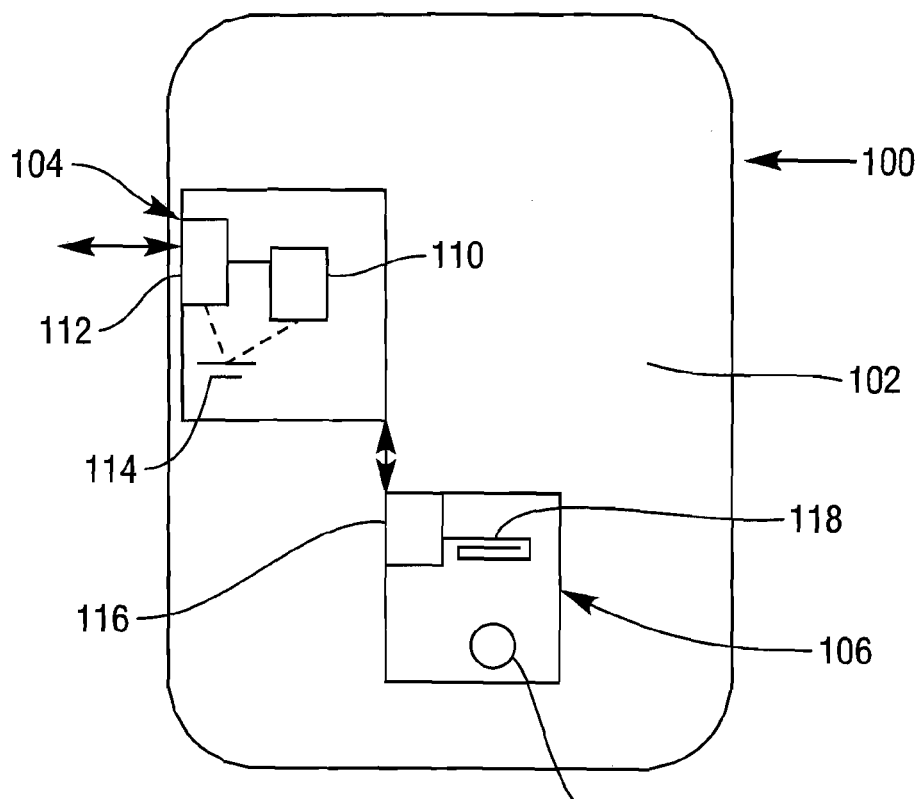
FIG. 1 is a schematic representation of an embodiment of a smart poster according to the first aspect of the present invention.

Referring now to FIG. 1, a smart poster 100 comprises a display 102, a transceiver unit 104 and a NFC tag 106. The transceiver unit 104 and NFC tag 106 may be separate entities, or may be integrated into a unitary telecommunications device.

Typically, the display 102 comprises a standard print media display bearing a printed poster with a touch point 108 designated within it. However, it will be appreciated that the display 102 can comprise a dynamic display such as a cathode ray tub, a liquid crystal display or a plasma display. The use of such dynamic displays allows for video clips or changing elements of an advertising campaign to be displayed on the display 102. In the case of a dynamic display 102 the touch point 108 will typically be located on a frame or to the side of the display 102, but may be located within the bounds of the display 102. Typically, the touch point 108 will be located adjacent the NFC tag 106.

The transceiver unit 104 comprises a processor 110 and a network connection device 112 and a power source 114. Typically, the network connection device 112 comprises a cellular telecommunications device such as a mobile telephone SIM card and dialer or a wireless broadband modem, for example a 3G-UTMS modem. However, it will be appreciated that the network connection device 112 may comprise a hard wired broadband modem that connects to a wired telecommunications infrastructure, for example on supporting ISDN or ASDL data transfer. The power source 114 provides power for the processor 110 and the network connection device 112. Typically, the power source 114 is battery but it may be a step down transformer connected to an a.c. mains power supply. In certain embodiments, the processor 110 runs a software application that manages buffering of data and operates on locally held data, for example usage history or queued content. This allows the smart poster 100 continue active operation while a remote server is not in direct control of the poster 100, providing a level of local management/control.

The NFC tag 106 comprises a processor 116 and a loop antenna 118. The processor 116 stores information for transfer to a mobile device. The processor 110 of the transceiver unit 104 is in communication with the processor 116 of the NFC tag 106 such that each time that the NFC tag 106 is interrogated usage data indicative of, inter alia, the accessing of the NFC tag 106 passes to the processor 110 of the transceiver unit 104. The usage data is either buffered locally at the processor 110 or passed directly to a remote server, as described hereinafter.

The NFC tag 106 can be operated in a passive mode in which the tag 106 draws its operating power from the electromagnetic radiation emitted by an interrogating mobile device that is captured at the antenna 118.

Alternatively, the tag 106 may be an active device and draw upon the power source 114 in order to generate its own electromagnetic radiation when triggered. When an active tag 106 is idle no power is drawn. The present invention will be described with reference to a passive system, although it will be appreciated that it is equally applicable to an active system.

Typically, the NFC tag 106 emits and receives electromagnetic radiation at 13.56 MHz with a 2.0 MHz bandwidth and usually supports data rates of 106 Kbps$^{-1}$ using modified Miller coding with 100% modulation, or 212 or 424 Kbps$^{-1}$ using Manchester coding with a 10% modulation ratio. A typical effective range of an NFC tag is up to 20 cm.

Figure 2:
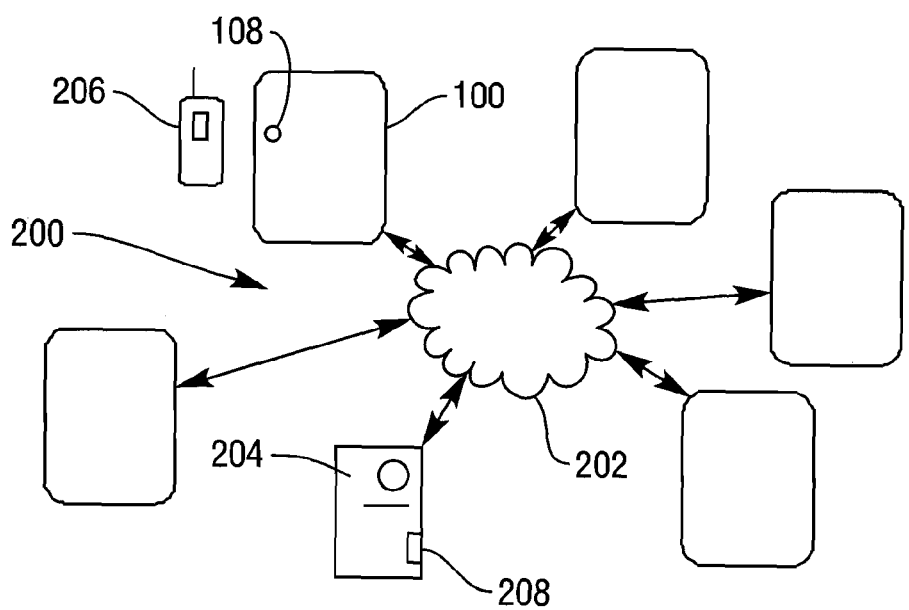
FIG. 2 is a schematic representation of an embodiment of a smart poster monitoring system the second aspect of the present invention comprising a network of smart posters of which at least one is a smart poster of FIG. 1.

Referring now to FIGS. 1 and 2, a smart poster monitoring system 200 comprises a plurality of smart posters 100, a communications network 202 and a server 204. Each of the smart posters 100 connects to the communications network 202 via their respective network connection devices 112. In the case of the communications network 202 being a wireless cellular telecommunications network, the nature of the network infrastructure will be known to a person skilled in the art. Similarly, a wired communications network will have infrastructure known to a person skilled in the art.

In use, a user brings their NFC enabled mobile device 206 adjacent to the touchpoint 108 of the smart poster 112. The mobile device 206 emits an interrogation signal that is received by the aerial 118.

The processor 116 of the tag 106 extracts sufficient power from the interrogation signal to power its operation. The processor 116 demodulates the interrogation signal, for example in the case of a backscattering passive tag by means of a Schottky diode that is impedance matched to the aerial 118. Other suitable demodulators known to a person skilled in the art can be employed. The processor 116 can then either extract information from the interrogation signal or the processor 116 can interrogate the mobile device 206 in order to obtain this information by generating an extraction signal which is transmitted via the aerial 118, the mobile device 206 can respond to this signal, or not dependent upon the permissions set by a user. Typical information extracted from the mobile device 206 comprises telephone number, user identity, telecommunications service provider.

The processor 116 then passes the extracted data to the transceiver unit's processor 110 where it can be aggregated with extracted data relating to previous transactions mobile devices and the smart poster 100. Some initial analysis processing of the extracted data may be performed at the processor 110, or the data may not be processed at the processor 110.

The remote server 204 can access the transceiver unit 104 via the network connection device 112 in order to download the extracted data from the processor 110 via network 202 either periodically, or as the data is extracted from the mobile device 206.

The server 204 runs analysis software 208 that analyses the usage of the smart posters 100, for example to determine which geographic area has the highest use of smart posters and/or which mobile telephony service provider's handsets are used most often. It is envisaged that the server 204 can be linked to a mobile telephony service provider's server to allow that detailed information about the owner of the mobile device 206 to be accessed in order to improve the richness of data available for improving the accuracy of demographic analysis of use of the smart posters 100. Examples of data that could be accessed from the mobile telephony service providers servers include, but are not limited to, sex, age, address, average mobile telephone bill cost of the person accessing the smart poster 100.

Such analysis of usage data allows targeting of smart poster usage and the variation of smart poster content dependent upon the demographics of the users accessing them. For example, a promotional smart poster for a pop concert may be targeted at users aged over twenty one and include an electronic voucher for a free alcoholic beverage at the concert. However, if an analysis of the demographic data showed that the majority of users accessing the smart post in a particular location were aged sixteen or under the content of the smart poster could be changed to remove the free alcoholic beverage electronic voucher from this location.

Additionally, the server 204 can store reference content data. The validity of content stored upon each of the smart posters 100 can be verified by uploading the content data stored on each of the NFC tag processors 110 to the server 204 via the network 202 and the transceiver unit 104. The server 204 carries out a comparison between the uploaded content and the reference content data. If a difference is noted, for example if the content data stored on a poster 100 has become corrupted or has been altered deliberately by a third party, the server 204 uploads a copy of the reference content data to the poster 100, typically with instructions to overwrite the content data currently stored on the poster 100. Thus, the content data stored on the posters 100 can be maintained in good order without having to manually replace the NFC tag 106 of each poster 100.

Similarly, the server 204 can be loaded with new content data and can distribute the new content data to each of the smart poster's NFC tags 106 via the network 202 and the respective transceiver units 104 of each of the smart posters 100. The server 204 can instruct the NFC tags' processors 116 to overwrite or delete the existing content data stored upon them. Alternatively, the server 204 can instruct the NFC tags' processors 116 store the new content data alongside the existing content data stored upon them.

In some embodiments, the server 204 controls the synchronization of media to be displayed with the content of the NFC tag's processor 116 to be output. This can comprise synchronously updating video output from a screen with data available for upload, or issuing instructions to a mechanical poster to engage a scroll mechanism synchronous to updating data stored on the NFC tag's processor 116.

Furthermore, the server 204 can poll each of the smart posters 100 via the network 202 and the transceiver unit 104. The transceiver unit 104 passes the poll to the NFC tag 106 requesting a response from the processor 116. If the NFC tag 106 does not respond to being polled the transceiver unit's processor 110 generates an error message which is routed to the server 204 via the respective network connection device 112 and the network 202. This error message is logged at the server 204 and the server 204 generates a warning signal that the NFC tag 106 of that particular smart poster 100 is not operative. If the transceiver unit 104 does not respond to polling by the server 204 the server generates a warning signal indicating that no response has been received from the smart poster 100.

Typically, the warning signals are input into maintenance scheduling software in which the repair of the smart poster 100, be it the NFC tag 106 or the transceiver unit 104 is scheduled. In one embodiment, the maintenance scheduling software may comprise a module that incorporates the statistical analysis of the usage data of the smart poster 100 in determining the priority of the maintenance of the smart poster 100. For example, a smart poster located at a city centre underground station receiving thousands of uses per day would likely be prioritized for maintenance over a smart poster located at a rural rail station that receives only tens of hits per day.

Figure 3:
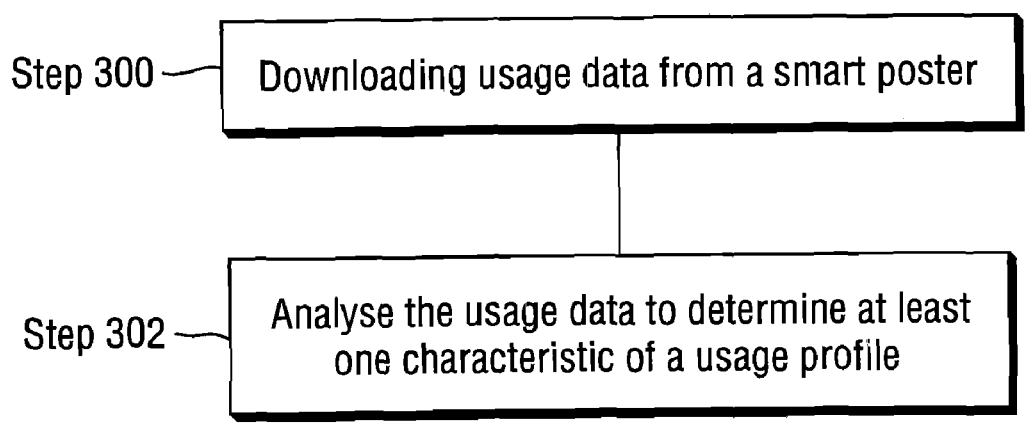
FIG. 3 is a flow diagram showing the steps of a method of improving the targeting of an advertising campaign according to the third aspect of the present invention.

Referring now to FIG. 3, a method of improving the targeting of an advertising campaign comprises downloading usage data from a smart poster (Step 300) and analyzing the usage data to determine at least one characteristic of a usage profile (Step 302).

Figure 4:
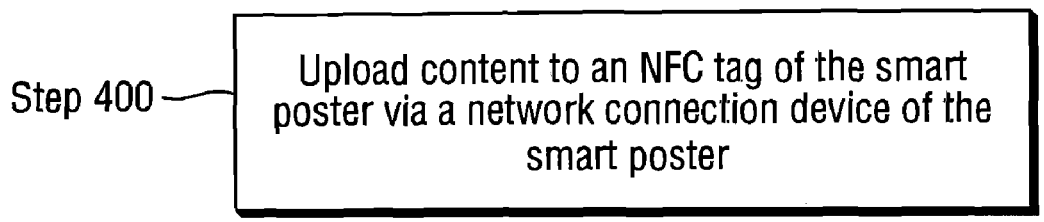
FIG. 4 is a flow diagram showing the steps of a method of varying content downloadable from a smart poster according to the fourth aspect of the present invention.

Referring now to FIG. 4, a method of varying content downloadable from a smart poster comprises uploading content to an NFC tag of the smart poster via a network connection device of the smart poster (Step 400).

Various modifications may be made to the above described embodiments within the scope of the present invention.

The invention claimed is:

1. A smart poster comprising:
a near field communications (NFC) device; and
a transceiver unit;
the NFC device being arranged to transmit data to a mobile device upon the mobile device coming into the transmission range of the NFC device;
the transceiver unit comprising a network connection device and a processor, the processor being operably connected to the NFC device and arranged to monitor the transmission of data by the NFC device, wherein the processor is arranged to communicate details of a transaction between the NFC device and the mobile device to a remote server over a network via the network connection device, and wherein the processor is arranged to compare verification data received from the remote server to data stored upon the NFC device in order to verify that the data stored upon the NFC device is valid.

2. A smart poster according to claim 1 wherein the NFC device is arranged to interrogate the mobile device during connection therewith.

3. A smart poster according to claim 2 wherein the processor is arranged to communicate data received at the NFC device during interrogation of the mobile device to the remote server.

4. A smart poster according to claim 1 wherein the NFC is arranged to interrogate the mobile device for data relating to any of the following: telephone number, user identity, or telecommunications service provider.

5. A smart poster according to claim 1 wherein the processor is arranged to collect usage data indicative of the number of times that the NFC device has been accessed.

6. A smart poster according to claim 1 wherein the processor of transceiver unit is arranged to be interrogated by the remote server.

7. A smart poster according to claim 1 wherein the processor is arranged to receive corrected or update updated data from the remote server and is further arranged to upload the data to the NFC device.

8. A smart poster comprising:
a near field communications (NFC) device; and
a transceiver unit;
the NFC device being arranged to transmit data to a mobile device upon the mobile device coming into the transmission range of the NFC device;
the transceiver unit comprising a network connection device and a processor, the processor being operably connected to the NFC device and arranged to monitor the transmission of data by the NFC device, wherein the processor is arranged to communicate details of a transaction between the NFC device and the mobile device to a remote server over a network via the network connection device, and wherein the remote server is arranged to compare content data received from the NFC device to reference data stored upon the remote server in order to verify that the content data stored upon the NFC device is valid.

9. A smart poster according to claim 8 wherein the NFC device is arranged to interrogate the mobile device during connection therewith.

10. A smart poster according to claim 9 wherein the processor is arranged to communicate data received at the NFC device during interrogation of the mobile device to the remote server.

11. A smart poster according to claim 8 wherein the NFC is arranged to interrogate the mobile device for data relating to any of the following: telephone number, user identity, or telecommunications service provider.

12. A smart poster according to claim 8 wherein the processor is arranged to collect usage data indicative of the number of times that the NFC device has been accessed.

13. A smart poster according to claim 8 wherein the processor of transceiver unit is arranged to be interrogated by the remote server.

14. A smart poster according to claim 8 wherein the processor is arranged to receive corrected or updated data from the remote server and is further arranged to upload the data to the NFC device.

* * * * *